(12) United States Patent
Li et al.

(10) Patent No.: US 12,202,061 B2
(45) Date of Patent: Jan. 21, 2025

(54) ELECTRIC CIRCULAR SAW

(71) Applicant: Nanjing Chervon Industry Co., Ltd., Nanjing (CN)

(72) Inventors: Cong Li, Nanjing (CN); Shisheng Wang, Nanjing (CN); Mingqi Zhou, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 382 days.

(21) Appl. No.: 17/226,245

(22) Filed: Apr. 9, 2021

(65) Prior Publication Data

US 2021/0331260 A1     Oct. 28, 2021

(30) Foreign Application Priority Data

Apr. 28, 2020 (CN) .......................... 202010347168.5

(51) Int. Cl.
*B23D 45/16* (2006.01)
*B23D 47/12* (2006.01)
*B25F 5/02* (2006.01)

(52) U.S. Cl.
CPC .............. *B23D 45/16* (2013.01); *B23D 47/12* (2013.01); *B25F 5/02* (2013.01)

(58) Field of Classification Search
CPC ......... B25F 5/008; B27B 17/086; B27B 9/02; B23D 47/12; B23D 47/126; B23D 45/12; B23D 47/02; B23D 59/003; E01C 23/09
See application file for complete search history.

(56) References Cited

U.S. PATENT DOCUMENTS

| | | | | |
|---|---|---|---|---|
| 1,900,553 A | * | 3/1933 | Hampton | B23D 47/126 83/397 |
| 2,072,750 A | * | 3/1937 | Hampton | B27B 9/00 29/DIG. 60 |
| 2,391,186 A | * | 12/1945 | Noble | F16H 57/0498 184/104.1 |
| 3,123,109 A | * | 3/1964 | Bork | F16J 15/54 30/388 |
| 3,721,141 A | * | 3/1973 | Frostad | B27G 19/04 144/251.1 |
| 4,489,633 A | * | 12/1984 | van de Wouw | B27G 19/02 83/464 |
| 4,876,797 A | * | 10/1989 | Zapata | B25F 5/006 30/388 |

(Continued)

FOREIGN PATENT DOCUMENTS

WO     WO2016089764     *   6/2016   ........... F16J 15/3204

*Primary Examiner* — Ghassem Alie
*Assistant Examiner* — Samuel A Davies
(74) *Attorney, Agent, or Firm* — Greenberg Traurig, LLP

(57) ABSTRACT

An electric circular saw includes a motor, a transmission assembly, a housing assembly, a base plate, and a fan shield. The housing assembly includes a gearbox. The base plate includes a base plate plane surface. The fan shield includes a flow guide part and a fitting part. The fitting part is connected to the gearbox. The transmission assembly includes a worm and a worm gear. A tip diameter of the worm is greater than or equal to 20 mm and less than or equal to 30 mm and a tip diameter of the worm gear is greater than or equal to 20 mm and less than or equal to 35 mm. When the electric circular saw has a maximum cutting depth, a vertical distance between a center of the worm gear and the base plate plane surface is less than or equal to 25.5 mm.

9 Claims, 9 Drawing Sheets

(56) References Cited

U.S. PATENT DOCUMENTS

| | | | | |
|---|---|---|---|---|
| 5,856,715 | A * | 1/1999 | Peot | B23D 47/12 310/90 |
| 8,113,922 | B2 * | 2/2012 | Esenwein | B25F 5/02 451/449 |
| 2002/0133955 | A1 * | 9/2002 | Kani | B27G 19/04 30/390 |
| 2003/0163924 | A1 * | 9/2003 | Hempe | B23D 49/16 30/388 |
| 2006/0156887 | A1 * | 7/2006 | Hutchings | B23D 47/126 83/581 |
| 2008/0244910 | A1 * | 10/2008 | Patel | B27G 19/04 30/377 |
| 2009/0071017 | A1 * | 3/2009 | Gehret | B27B 9/02 30/391 |
| 2009/0223069 | A1 * | 9/2009 | Parks | B27B 9/00 30/391 |
| 2009/0223337 | A1 * | 9/2009 | Wikle | B27B 5/38 83/397 |
| 2010/0170538 | A1 * | 7/2010 | Baker | B08B 5/04 134/18 |
| 2012/0005904 | A1 * | 1/2012 | Zwirkoski | B23D 61/02 83/13 |
| 2012/0042524 | A1 * | 2/2012 | Deeter | A61F 5/05 83/13 |
| 2013/0152407 | A1 * | 6/2013 | Wikle | B27G 19/04 30/391 |
| 2015/0266201 | A1 * | 9/2015 | Nakashima | B27B 9/02 30/374 |
| 2016/0121513 | A1 * | 5/2016 | Mahoney | B23D 45/16 30/374 |
| 2018/0236574 | A1 * | 8/2018 | Kume | B23Q 11/046 |
| 2019/0039228 | A1 * | 2/2019 | Matsushita | B25F 5/008 |
| 2019/0044110 | A1 * | 2/2019 | Sheeks | H02K 5/20 |
| 2019/0334459 | A1 * | 10/2019 | Chen | H02P 23/0031 |

* cited by examiner

ELECTRIC CIRCULAR SAW

RELATED APPLICATION INFORMATION

This application claims the benefit under 35 U.S.C. § 119(a) of Chinese Patent Application No. CN 202010347168.5, filed on Apr. 28, 2020, which is incorporated by reference in its entirety herein.

BACKGROUND

An electric circular saw is used for cutting a workpiece and provided with a base plate for assisting in a cutting action. A worm-drive circular saw is an electric circular saw driven by a worm gear. Due to the limitation of the worm gear, a relatively large space needs to be reserved for the rotation center of a saw blade with respect to the base plate, which is not conducive to improving the maximum cutting depth of the electric circular saw. Moreover, when saw blades with the same specifications are mounted to improve a cutting depth, the electric circular saw increases in size and thus is inconvenient to operate.

SUMMARY

In one aspect of the disclosure, an electric circular saw includes a motor, a saw blade, a transmission assembly, a housing assembly, a base plate, a fan, and a fan shield. The saw blade is driven by the motor to rotate about a first axis. The transmission assembly connects the motor to the saw blade. The housing assembly includes a gearbox and a holding part to be held, where the gearbox is configured to support the transmission assembly. The base plate is connected to the housing assembly and includes a base plate plane surface for contacting a workpiece. The fan is driven by the motor to generate a heat dissipation airflow. The fan shield is disposed along a circumferential direction of the fan. The fan shield includes a flow guide part and a fitting part. The flow guide part is configured to guide a flow direction of the heat dissipation airflow. The fitting part is disposed around the flow guide part in a circumferential direction of the flow guide part and connected to the gearbox. The transmission assembly includes a worm and a worm gear that meshes with the worm, the worm gear is connected to the saw blade and configured to drive the saw blade, the first axis penetrates through a center of the worm gear, and the worm is connected to the motor. A tip diameter of the worm is greater than or equal to 20 mm and less than or equal to 30 mm, and a tip diameter of the worm gear is greater than or equal to 20 mm and less than or equal to 35 mm. The base plate is rotatable with respect to the housing assembly and has a first position where the electric circular saw has a maximum cutting depth, and when the base plate is at the first position, a vertical distance between the center of the worm gear and the base plate plane surface is less than or equal to 25.5 mm.

In one example, the worm extends along a second axis, and when the base plate is at the first position, an angle between the second axis and the base plate plane surface is greater than or equal to 10 degrees and less than or equal to 18 degrees.

In one example, the flow guide part is annular or semi-annular, and the fitting part is a protrusion disposed on an outer wall of the flow guide part; and an interior of the gearbox includes a mounting groove, and the protrusion is placed in the mounting groove such that the fan shield is fixedly connected to the gearbox.

In one example, the fan includes a rotating shaft and a fan blade connected to the rotating shaft, and a maximum diameter of the fan is greater than or equal to 70 mm and less than or equal to 85 mm.

In one example, the gearbox includes a surrounding part disposed on an outer periphery of the fan shield and provided with a wind path rib for guiding the heat dissipation airflow.

In one example, a distance between an outer edge of the fan blade and the flow guide part is greater than or equal to 0.4 mm and less than or equal to 1.6 mm.

In one example, the base plate includes a first adjustment assembly configured to adjust an inclination angle of the base plate with respect to the housing assembly and cause the base plate to rotate about a third axis with respect to the housing assembly, where a shortest distance between the third axis and the saw blade is greater than or equal to 6 mm and less than or equal to 8 mm.

In one example, the base plate has a first side, a second side, and a perforation through which the saw blade penetrates, where a shortest distance from the first side to the perforation ranges from 56.5 mm to 60.5 mm, and a distance between the third axis and the second side ranges from 45 mm to 49 mm.

In one example, an outer diameter of the motor is less than 95 mm, a stack length of a stator of the motor is greater than or equal to 28 mm and less than or equal to 60 mm, and rated output power of the motor is greater than or equal to 1800 W.

In one example, in a case where the saw blade has a diameter of 7.25 inches, the maximum cutting depth of the electric circular saw is greater than or equal to 64.5 mm and less than or equal to 68.5 mm.

In one example, the electric circular saw further includes an air guide member, where the air guide member is disposed on a side of the fan where an air outlet end is located and between the fan and the transmission assembly, and the air guide member is configured to guide at least part of the heat dissipation airflow flowing out of the fan to flow through the transmission assembly.

In another aspect of the disclosure, an electric circular saw includes a motor, a saw blade, a transmission assembly, a housing assembly, a base plate, and a fan. The saw blade is driven by the motor to rotate about a first axis. The transmission assembly connects the motor to the saw blade. The housing assembly is configured to support the transmission assembly. The base plate is connected to the housing assembly and includes a base plate plane surface for contacting a workpiece. The fan is driven by the motor to generate a heat dissipation airflow. The transmission assembly includes a worm and a worm gear that meshes with the worm, the worm gear is connected to the saw blade and configured to drive the saw blade, the first axis penetrates through a center of the worm gear, and the worm is connected to the motor. The base plate is rotatable with respect to the housing assembly and has a first position where the electric circular saw has a maximum cutting depth. The worm extends along a second axis, and when the base plate is at the first position, an angle between the second axis and the base plate plane surface is greater than or equal to 10 degrees and less than or equal to 18 degrees. A tip diameter of the worm is greater than or equal to 20 mm and less than or equal to 30 mm, a tip diameter of the worm gear is greater than or equal to 20 mm and less than or equal to 35 mm, and a vertical distance between the center of the worm gear and the base plate plane surface is less than or equal to 25.5 mm. In a case where the saw blade has a diameter of 7.25 inches, the maximum cutting depth of the electric circular saw is greater than or equal to 64.5 mm and less than or equal to 68.5 mm.

In one example, an outer diameter of the motor is less than 95 mm, a stack length of a stator of the motor is greater than or equal to 28 mm and less than or equal to 60 mm, and rated output power of the motor is greater than or equal to 1800 W.

DETAILED DESCRIPTION

Figure 1:
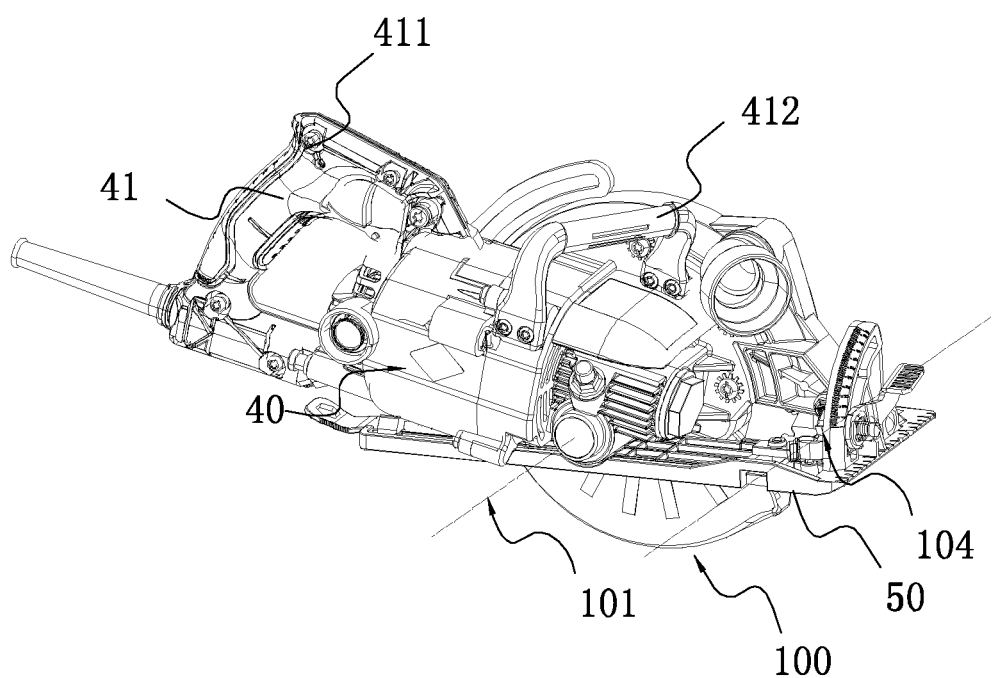
FIG. 1 is a perspective view of an electric circular saw according to the present disclosure.

The present disclosure is described below in detail in conjunction with drawings and examples.

The present disclosure provides an electric circular saw 100. Referring to FIG. 1 to FIG. 4, the electric circular saw 100 includes a motor 10, a saw blade 20, a transmission assembly 30, a power supply device, a housing assembly 40, and a base plate 50. The power supply device provides energy for the motor 10, and the motor 10 drives the saw blade 20 to rotate about a first axis 101 via the transmission assembly 30. The saw blade 20 of the electric circular saw 100 generally adopts a circular saw blade, and the circular saw blade rotates to cut a workpiece. The electric circular saw 100 may be an alternating current electric tool and accordingly, the power supply device is an alternating current power supply device. The electric circular saw 100 may also be a direct current electric tool. In this case, for example, the power supply device may be a battery pack.

Figure 3:
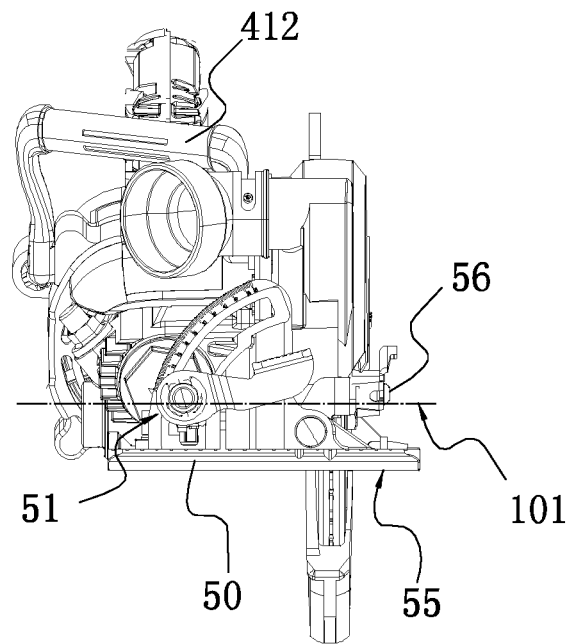
FIG. 3 is a plan view of the electric circular saw in FIG. 1 from another angle.
Figure 4:
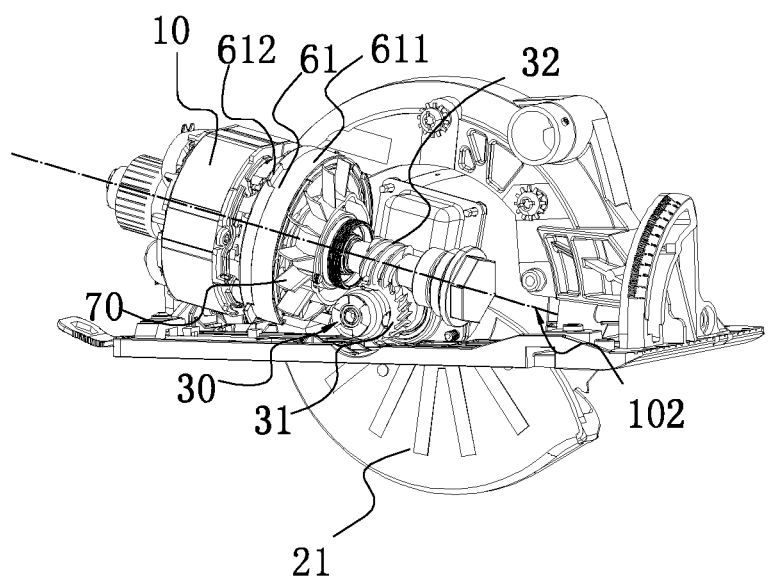
FIG. 4 is a structure view of a motor and a transmission assembly of the electric circular saw in FIG. 1.
Figure 5:
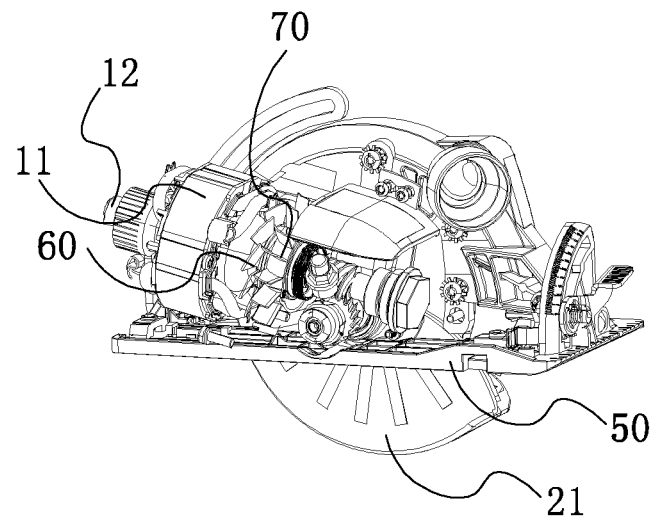
FIG. 5 is a structure view of a fan and an air guide member of the electric circular saw in FIG. 1.

Referring to FIG. 4 and FIG. 5, the motor 10 includes a rotor, a stator 11, and a motor shaft 12. The motor shaft 12 extends along a second axis 102 and is connected to the transmission assembly 30 in a meshed manner. When the motor 10 operates, the motor shaft 12 drives the transmission assembly 30 to move so as to drive the saw blade 20 to rotate. The motor 10 is connected to the saw blade 20 via the transmission assembly 30 such that the second axis 102 and the first axis 101 are staggered with respect to each other. The second axis 102 and the first axis 101 form a group of non-coplanar lines. The electric circular saw 100 includes a mounting device for mounting the saw blade 20, where the mounting device may be configured to mount the saw blade 20 via a flange connection or a screwed connection. Referring to FIG. 3 to FIG. 7A, the transmission assembly 30 includes a worm gear 31 and a worm 32 that match with each other and further includes an output shaft extending along the first axis 101, where the worm gear 31 and the worm 32 are staggered with each other. The worm 32 is fixedly connected to and disposed coaxially with the motor shaft 12, and the worm 32 also extends along the second axis 102. The worm gear 31 is fixedly connected to the output shaft, and the saw blade 20 is mounted on the output shaft through the mounting device, such that the worm gear 31 drives the output shaft to rotate to drive the saw blade 20 to rotate at a high speed. The output shaft is sleeved on a first bearing configured to support and position the output shaft. The worm 32 is provided with a second bearing configured to support the worm 32. A gearbox 42 forms an accommodating cavity for accommodating the transmission assembly 30 so that the transmission assembly 30 is supported by the gearbox 42.

Figure 2:
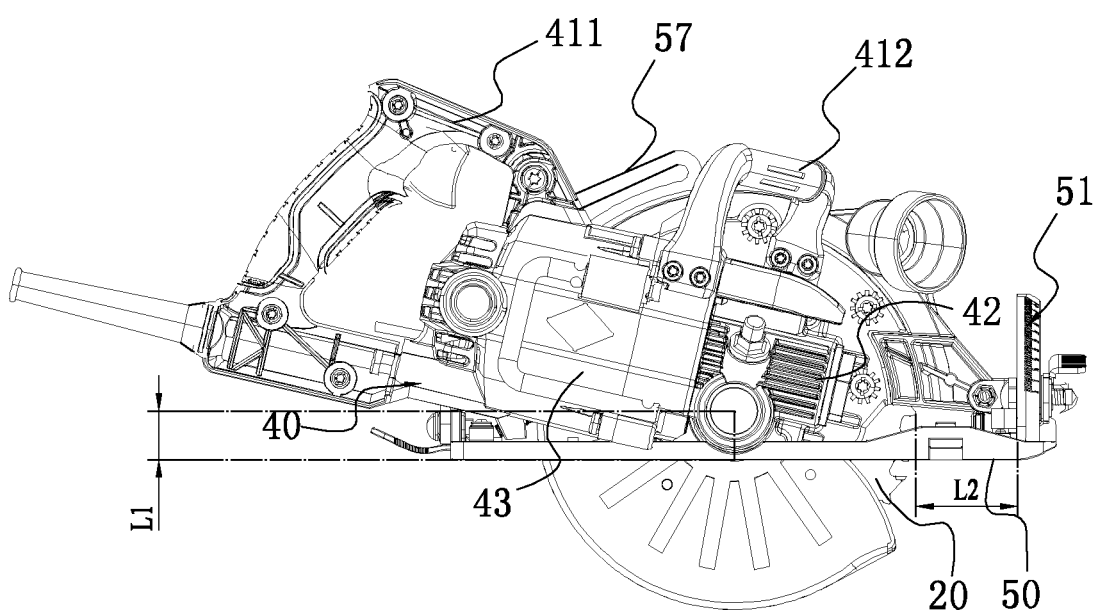
FIG. 2 is a plan view of the electric circular saw in FIG. 1.
Figure 14:
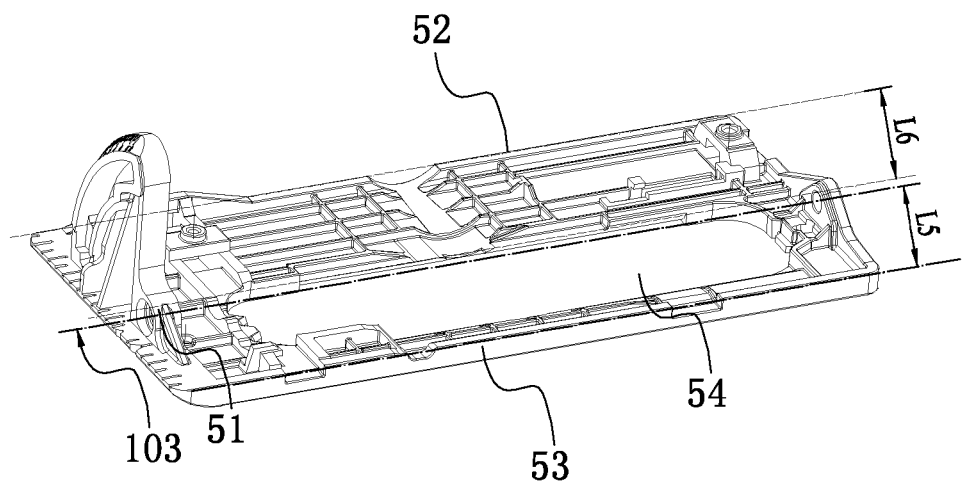
FIG. 14 is a structure view of a base plate of the electric circular saw in FIG. 1.

Referring to FIG. 3, the base plate 50 is connected to the housing assembly 40. As shown in FIG. 2 and FIG. 14, the base plate 50 includes a base plate body and a perforation 54 disposed on the base plate body, where the saw blade 20 penetrates through the perforation 54. When the electric circular saw 100 operates, the saw blade 20 rotates in the middle of the base plate 50, and the base plate 50 assists a user in cutting with the electric circular saw 100. The base plate 50 has a base plate plane surface 55 extending within a first plane, and the base plate plane surface 55 is in contact with a workpiece to be cut to assist the user in cutting. One end of the base plate 50 includes a first adjustment assembly 51 for adjusting an inclination angle of the base plate 50 with respect to the housing assembly 40. The first adjustment assembly 51 includes a scale, a rotary switch, and a rotating shaft connecting the housing assembly 40 and the base plate 50. A relative rotation between the base plate 50 and the housing assembly 40 is achieved by the rotating shaft, and the base plate 50 operably rotates about a third axis 103 through the rotary switch such that the saw blade 20 is inclined with respect to the base plate 50, thus achieving inclined cutting of the electric circular saw 100. The electric circular saw 100 further includes a second adjustment assembly 56. The second adjustment assembly 56 includes a rotating shaft connecting the base plate and the housing assembly and a guide rail 57. The second adjustment assembly 56 enables the housing assembly 40 to drive the saw blade 20 to rotate about a fourth axis 104. Optionally, the fourth axis 104 is parallel to the first axis 101. The second adjustment assembly 56 drives the saw blade 20 to rotate about the fourth axis 104 so that a size of a cutting portion of the saw blade 20 extending to a lower side of the base plate plane surface 55 in a direction perpendicular to the base plate plane surface 55 is changed accordingly. In this way, a cutting depth of the electric circular saw 100 can be adjusted according to a thickness of the workpiece to be cut, thereby cutting workpieces with different sizes.

The housing assembly 40 includes a holding part 41, the gearbox 42, and a motor housing 43. The holding part 41 includes at least a main handle 411 for the user to hold. The main handle 411 is disposed at a tail of the electric circular saw 100 and close to the motor housing 43, and the user controls the electric circular saw 100 by holding the main handle 411. The holding part 41 further includes an auxiliary handle 412. The auxiliary handle 412 extends in a direction substantially perpendicular to the second axis 102. The main handle 411 and the auxiliary handle 412 are simultaneously held so that the electric circular saw 100 is stably controlled, thereby facilitating the manipulation by the user.

The motor housing 43 is configured to support the motor 10 and disposed adjacent to and connected to the gearbox 42. The housing assembly 40 further includes a saw blade shield 21. One side of the saw blade shield 21 is rotatably connected to a base, and another side of the saw blade shield 21 is fixedly connected to the motor housing 43. The saw blade shield 21 is distributed at least in part along a circumferential direction of the saw blade 20 such that a portion of the saw blade 20 is disposed in the saw blade shield 21, thereby improving the safety of use of the electric circular saw 100. A portion of the saw blade shield 21 is configured to be rotatable such that a size of a portion of the saw blade 20 exposed out of the saw blade shield 21 can be adjusted. An interior of the motor housing 43 communicates with an interior of the gearbox 42, and the motor 10 and the transmission assembly 30 extend coaxially in the motor housing 43 and the gearbox 42, respectively.

Figure 8:
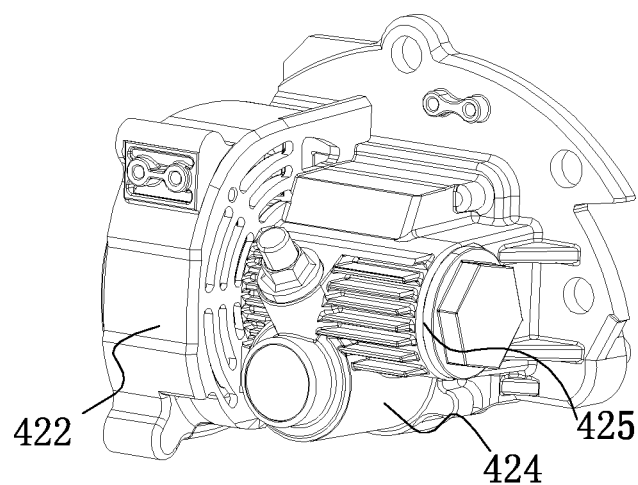
FIG. 8 is a structure view of a gearbox of the electric circular saw in FIG. 1.
Figure 9:
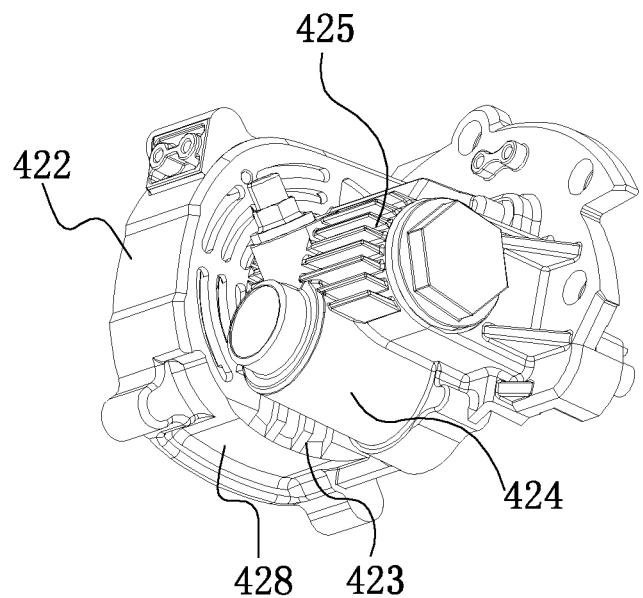
FIG. 9 is a structure view of a gearbox of the electric circular saw in FIG. 1 from another angle.
Figure 10:
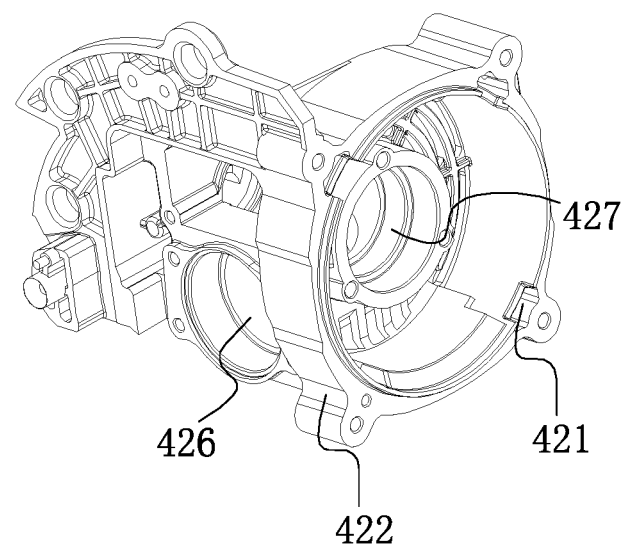
FIG. 10 is a structure view of a gearbox of the electric circular saw in FIG. 1 from another angle.
Figure 11:
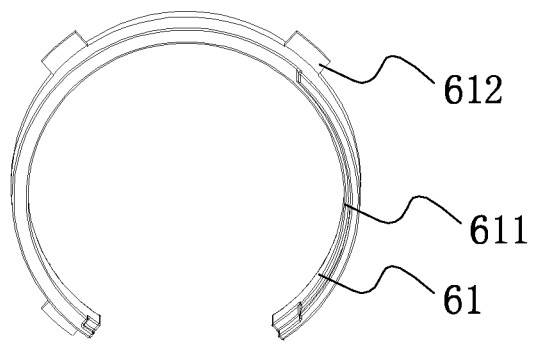
FIG. 11 is a structure view of a fan shield of the electric circular saw in FIG. 1.
Figure 12:
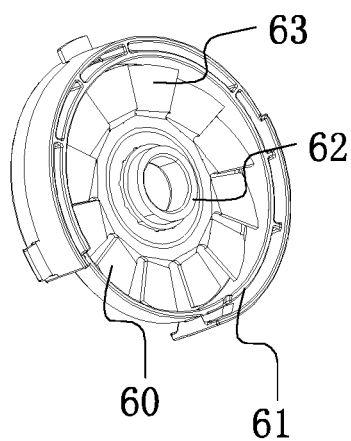
FIG. 12 is a structure view of a fan shield and a fan of the electric circular saw in FIG. 1.
Figure 13:
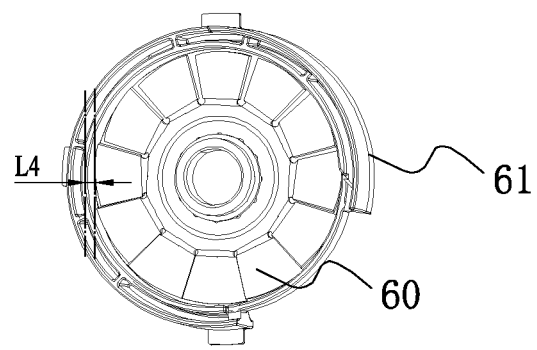
FIG. 13 is a structure view of a fan shield and a fan of the electric circular saw in FIG. 1.

Referring to FIG. 8 to FIG. 10, the gearbox 42 is provided with a worm gear accommodating chamber 424 and a worm accommodating chamber 425, where a worm gear accommodating cavity 426 is formed in the worm gear accommodating chamber 424, a worm accommodating cavity 427 is formed in the worm accommodating chamber 425, the worm gear accommodating chamber 424 extends along the first axis 101, and the worm accommodating chamber 425 extends along the second axis 102. The output shaft and the first bearing are disposed in the worm gear accommodating cavity 426, and the worm 32 and the second bearing are surrounded by the worm accommodating chamber 425. The worm accommodating chamber 425 and the worm gear accommodating chamber 424 are disposed obliquely with respect to each other, the worm gear accommodating chamber 424 and the worm accommodating chamber 425 are disposed above the base plate 50, and the worm gear 31 is a rotation center of the saw blade 20.

Referring to FIG. 4 and FIG. 11 to FIG. 13, the electric circular saw 100 includes a fan 60 connected to the motor shaft 12. The fan 60 rotates coaxially with the motor 10 and is disposed between the motor 10 and the transmission assembly 30. The fan 60 includes a rotating shaft 62 and fan blades 63 connected to the rotating shaft 62, where the rotating shaft 62 extends along the second axis 102, the fan blades 63 are radially distributed to form a sector, and the fan 60 is driven to rotate to generate a heat dissipation airflow. The fan 60 may be selected as an axial fan or a centrifugal fan. The motor housing 43 is provided with an air inlet, and the gearbox 42 is correspondingly provided with an air outlet. The heat dissipation airflow enters the interior of the motor housing 43 from the air inlet, flows through the motor 10 to dissipate heat of the motor 10, flows out of the gearbox 42 from the air outlet, and then flows through outer surfaces of the worm accommodating chamber 425 and the worm gear accommodating chamber 424 to dissipate heat of the worm gear 31 and the worm 32.

The gearbox 42 includes a surrounding part 422 surrounding the fan 60, where the surrounding part 422 is disposed on a side of the gearbox 42 and configured to connect the gearbox 42 to the motor housing 43. An interior of the surrounding part 422 is provided with a fan shield 61, where the fan shield 61 is disposed along a circumferential direction of the fan 60. In the absence of the fan shield 61, distances between end portions of the fan blades 63 and the surrounding part 422 are too large and uneven, which increases the loss in volume of the airflow during the operation of the fan 60. Therefore, the distances between the end portions of the fan blades 63 of the fan 60 and a wall surface of the surrounding part 422 are reduced through the fan shield 61, thereby increasing the volume of the airflow generated by the fan 60. The fan shield 61 is connected to only the gearbox 42 so that the fan shield 61 can be stably supported by the gearbox 42 and an even space is kept between the gearbox 42 and the fan shield 61.

The fan shield 61 is disposed along the circumferential direction of the fan 60 and includes a flow guide part 611 and a fitting part 612 disposed around the flow guide part 611 in a circumferential direction of the flow guide part 611. The flow guide part 611 is annular or semi-annular and includes an annular body, an inner wall surface of the flow guide part and an outer wall surface of the flow guide part, where the outer wall surface is farther away from the second axis 102 than the inner wall surface. The flow guide part 611 may be provided as a semi-annular body, and the semi-annular body matches with the gearbox 42 to form the inner wall surface of the flow guide part such that the distances between the end portions of the fan blades 63 of the fan 60 and the flow guide part 611 or the gearbox 42 are substantially the same. Optionally, the inner wall surface is configured to be smooth and uniform, and a projection of the fan 60 in a direction perpendicular to the second axis 102 is within a projection of the inner wall surface in the direction perpendicular to the second axis 102. The outer wall surface is fitted to the interior of the gearbox 42 such that the fan shield 61 can be assembled into the interior of the gearbox 42. The fitting part 612 is fitted to the gearbox 42. The fitting part 612 is a protrusion disposed around the flow guide part 611 in the circumferential direction of the flow guide part 611, an inner wall of the corresponding surrounding part 422 is provided with a mounting groove 421, and the protrusion is placed into the mounting groove 421 so that the fan shield 61 is fixedly connected to the surrounding part 422. Multiple fitting parts 612 may be provided and distributed on the outer wall surface of the annular body, and the mounting grooves 421 may be correspondingly provided in a manner that the number of the fitting parts 612 is equal to the number of the mounting grooves 421, so as to enhance connection strength. The protrusions with different lengths are provided so that a distance between the fan shield 61 and an outer diameter of the fan blades 63 can be adjusted. Optionally, referring to FIG. 13, a distance L4 between an outer edge of the fan blade 63 and the fan shield 61 is greater than or equal to 0.4 mm and less than or equal to 1.6 mm. The fan shield 61 is provided so that the volume of the airflow generated by the fan 60 is increased and the performance of heat dissipation for the motor 10 and the gearbox 42 is optimized. The mounting groove 421 is configured to be recessed towards the interior of the gearbox 42 from an end surface of the surrounding part 422 along the direction of the second axis 102. In this manner, when the fan shield 61 is assembled, the fitting parts 612 are aligned with the mounting grooves 421 and then the fan shield 61 is pushed along the direction of the second axis 102 such that the fitting parts 612 are placed into the mounting grooves 421 and the fan shield 61 is fixed through the assembly of the gearbox 42 and the motor housing 43. Therefore, an assembly process is simple and manufacturing costs are reduced.

The air outlet is disposed on the surrounding part 422 which is mated with the motor housing 43. The surrounding part 422 protrudes with respect to the worm gear accommodating chamber 424 and the worm accommodating chamber 425 in a plane perpendicular to the second axis 102 and forms a protruding surface. The protruding surface is provided with air holes and formed with a first air outlet. The heat dissipation airflow flows from the motor 10 to the gearbox 42, flows out from the first air outlet on the gearbox 42, and at least in partial flows through a side surface of the worm accommodating chamber 425 and a side surface of the worm gear accommodating chamber 424, so as to perform heat dissipation on the worm gear accommodating chamber 424 and the worm accommodating chamber 425. A lower side of the protruding surface is formed with a wind path rib 423 which forms a second air outlet. The second air outlet guides part of the heat dissipation airflow to flow through the side surface and a bottom surface of the worm gear accommodating chamber 424, thereby increasing the volume of the heat dissipation airflow and improving the heat dissipation effect on the worm gear 31 and the worm 32.

Referring to FIG. 4 and FIG. 5, the electric circular saw 100 further includes an air guide member 70, where the air guide member 70 is disposed on a side of the fan 60 where an air outlet end of the fan 60 is located and between the fan 60 and the transmission assembly 30, the air guide member 70 includes a mounting shaft and air guide vanes, and the air guide vanes are used for guiding at least part of the heat dissipation airflow from the fan 60 to flow through the transmission assembly 30. The mounting shaft is disposed coaxially with the motor shaft 12 and fixedly connected to the housing assembly 40. The air guide vanes are fixedly connected to the mounting shaft and distributed around the mounting shaft in a circumferential direction of the mounting shaft. The air guide vane forms a curved air guide surface, and the heat dissipation airflow generated by the fan 60 flows to the air guide member 70, and part of the heat dissipation airflow flows to the worm gear 31 and the worm 32 along a direction in which the air guide vanes extend, thereby increasing the volume of a heat dissipation airflow flowing through surfaces of the worm gear 31 and the worm 32.

Figure 7A:
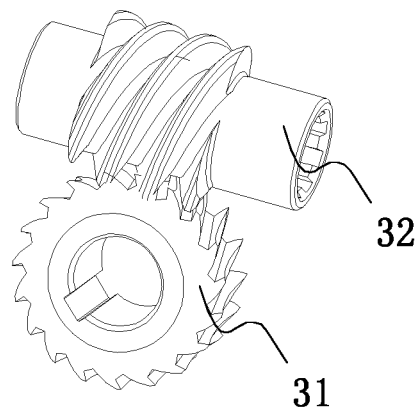
FIG. 7A is a structure view of a worm gear and a worm of the electric circular saw in FIG. 1.
Figure 7B:
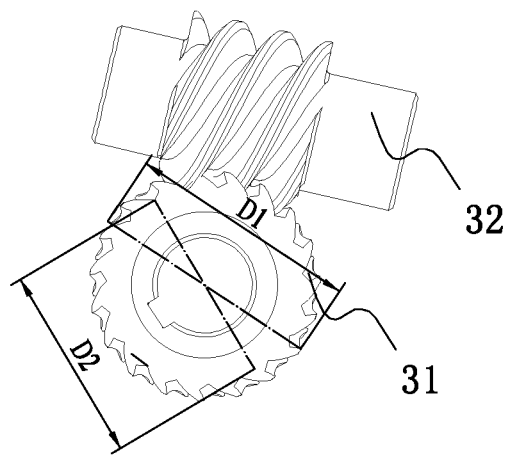
FIG. 7B is a schematic view illustrating a size of a worm gear of the electric circular saw in FIG. 1.
Figure 7C:
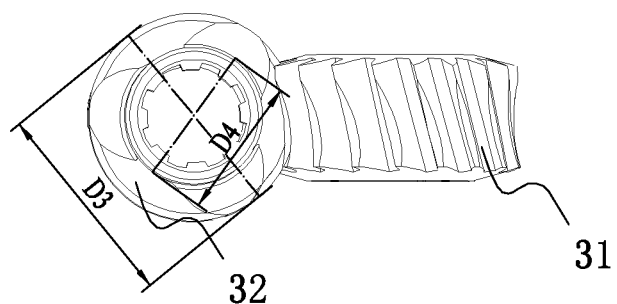
FIG. 7C is a schematic view illustrating a size of a worm of the electric circular saw in FIG. 1.

Referring to FIG. 7B and FIG. 7C, the optimization of the performance of heat dissipation for the worm gear 31 and the worm 32 can effectively reduce a temperature increase caused by the worm gear 31 and the worm 32 during the operation of the electric circular saw 100, so that sizes of the worm gear 31 and the worm 32 can be reduced to a certain extent on the premise that the requirements for heat dissipation are satisfied. A tip diameter D3 of the worm 32 is greater than or equal to 20 mm and less than or equal to 30 mm, a root diameter D4 of the worm 32 is greater than or equal to 13 mm and less than or equal to 20 mm, and a tooth width of the worm 32 is greater than or equal to 18 mm and less than or equal to 20 mm. The number of teeth of the worm 32 is greater than or equal to 3 and less than or equal to 4. A size of the first bearing is adaptively adjusted such that a diameter of the first bearing is greater than or equal to 34 mm and less than or equal to 36 mm. A size of the worm accommodating chamber 425 for accommodating the worm 32 may be correspondingly reduced with a decrease of the size of the worm 32. A tip diameter D1 of the worm gear 31 is greater than or equal to 20 mm and less than or equal to 35 mm. Optionally, the tip diameter D1 of the worm gear 31 is configured to be greater than or equal to 29 mm and less than or equal to 33 mm, a root diameter D2 of the worm gear 31 is greater than or equal to 20.5 mm and less than or equal to 23 mm, a tooth width of the worm gear 31 is greater than or equal to 15 mm and less than or equal to 19 mm, and the number of teeth of the worm gear 31 is greater than or equal to 14 and less than or equal to 19. A size of the worm accommodating chamber 424 for accommodating the worm gear 31 may be correspondingly reduced with a decrease of the size of the worm gear 31. Relative to a conventional electric circular saw 100, a size of the fan 60 may also be reduced. A diameter of the fan 60 is greater than or equal to 70 mm and less than or equal to 85 mm, and the surrounding part 422 for accommodating the fan 60 may be adjusted correspondingly. The gearbox 42 is relatively small in size so that the vertical distance between the center of the worm gear 31 and the base plate plane surface 55 is reduced. In this manner, a size of the whole electric circular saw 100 is optimized, so that the electric circular saw 100 is convenient for the user to hold.

Referring to FIG. 3 to FIG. 6, a position of the base plate 50 with respect to the housing assembly 40 is adjusted by the first adjustment assembly 51 and the second adjustment assembly 56 such that the base plate 50 has a first position with respect to the housing assembly 40 where the electric circular saw 100 has a maximum cutting depth. At this time, the base plate plane surface 55 is parallel to the first axis 101 and a distance therebetween is minimum, and the second axis 102 where the motor shaft 12 is located intersects the base plate plane surface 55 to form an angle greater than zero degrees and less than or equal to 18 degrees. When the base plate 50 is at the first position where the electric circular saw 100 has the maximum cutting depth, the first adjustment assembly 51 and the second adjustment assembly 56 are both in their initial positions. That is to say, a portion of the saw blade 20 extending out of the base plate 50 is maximum in size, and a plane where the saw blade 20 is located is perpendicular to the base plate plane surface 55. Referring to FIG. 3 to FIG. 4, an outer diameter of the motor 10 is configured to be less than or equal to 95 mm. In this manner, when the base plate 50 is at the first position, the vertical distance L1 between the center of the worm gear 31 and the base plate plane surface 55 is less than or equal to 30 mm. The vertical distance between the center of the worm gear 31 and the base plate plane surface 55 refers to a distance between the center of the worm gear 31 and the base plate plane surface 55 in a direction perpendicular to the base plate plane surface 55. When saw blades 20 with a same size are mounted on the electric circular saw 100, the vertical distance between the center of the worm wheel 31, that is, the first axis 101, and the base plate plane surface 55 determines the size of the saw blade 20 exposed out of the base plate 50 when the base plate 50 is at the first position, that is, the maximum cutting depth of the electric circular saw 100. When the electric circular saw 100 adopts the saw blade 20 with a diameter of 7.25 inches, a shortest distance L3 between the base plate plane surface 55 and a lowest point of the saw blade 20 is greater than or equal to 64.5 mm and less than or equal to 68.5 mm so that the electric circular saw 100 can directly cut woods with a specification of 2.5 inches. When the base plate 50 rotates 45 degrees about the third axis 103 from the first position through the first adjustment assembly 51, in the direction perpendicular to the base plate plane surface 55, a straight-line distance between the base plate plane surface 55 of the base plate 50 and the lowest point of the saw blade 20 is greater than or equal to 47.8 mm and less than or equal to 49.8 mm.

Referring to FIG. 2, a position of the saw blade 20 with respect to the base plate 50 is adjusted downwards after the saw blade 20 is mounted, and the first adjustment assembly 51 disposed on the base plate 50 and connected to the fan shield 61 is located on an upper side of the base plate 50 so that the position of the fan shield 61 is moved downwards with respect to the base plate 50 in correspondence with a mounting position of the saw blade 20, and so a shortest distance L2 between the first adjustment assembly 51 and the saw blade 20 is reduced. That is to say, relative to the conventional electric circular saw, the first adjustment assembly 51 is configured to move closer to the saw blade 20 so that the size of the whole structure can be reduced in the direction of the third axis 103 and the portability of the electric circular saw 100 is enhanced.

Referring to FIG. 14, the base plate 50 has a second side 53 and a first side 52, where the first side 52 is parallel to the plane where the saw blade 20 is located, and the second side 53 is parallel to the plane where the saw blade 20 is located. The perforation 54 is disposed between the second side 53 and the first side 52 and closer to the second side 53 than to the first side 52. In order to adapt to the changes in size of the worm gear 31 and the worm 32 and the position of the saw blade 20, a size of the perforation 54 is specially set such that a distance L5 between the third axis 103 and the second side 53 is greater than or equal to 45 mm and less than or equal to 49 mm, thereby increasing a range of adjustable angles of the base plate 50 with respect to the housing assembly 40 and enabling the electric circular saw 100 to perform cutting at more angles. The plane of the saw blade 20 is parallel to the third axis 103, a distance between the saw blade 20 and the third axis 103 is greater than or equal to 6 mm and less than or equal to 8 mm, and a shortest distance L6 between the first side 52 and the perforation 54 is greater than or equal to 56.5 mm and less than or equal to 60.5 mm, so as to maintain a projection of a center of gravity of the electric circular saw 100 on the first plane between the rotation center and the first side 52. In this manner, the stability of the operation of the electric circular saw 100 is improved, and it is convenient for the user to operate the electric circular saw 100.

Figure 6:
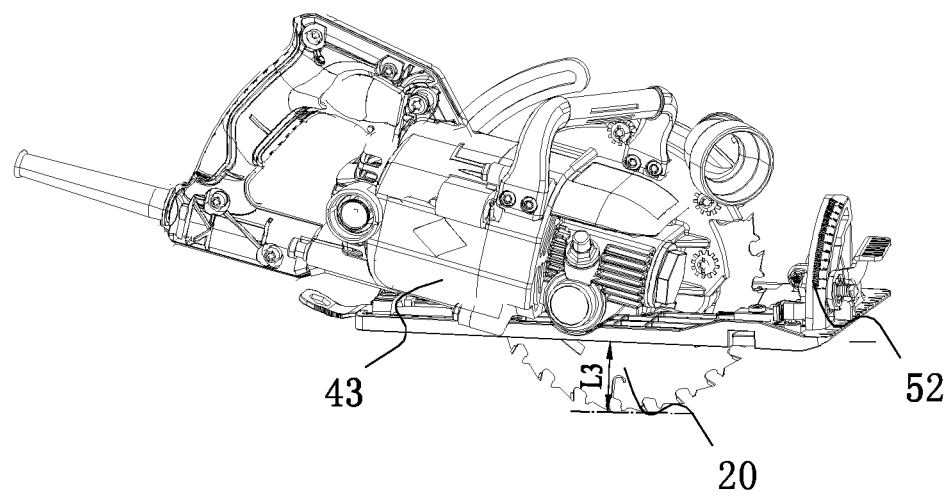
FIG. 6 is a schematic view of a maximum cutting depth of the electric circular saw in FIG. 1.

In one example, the tip diameter D3 of the worm 32 is configured to be greater than or equal to 24 mm and less than or equal to 25 mm, the root diameter D4 of the worm 32 is greater than or equal to 16 mm and less than or equal to 17 mm, and the tooth width of the worm 32 is greater than or equal to 19 mm and less than or equal to 20 mm. The number of teeth of the worm 32 is greater than or equal to 3 and less than or equal to 4. The size of the first bearing is adaptively adjusted such that the diameter of the first bearing is greater than or equal to 35 mm and less than or equal to 35.5 mm. The size of the worm accommodating chamber 425 for accommodating the worm 32 may be correspondingly reduced with the decrease of the size of the worm 32. The tip diameter D1 of the worm gear 31 is greater than or equal to 31 mm and less than or equal to 32 mm, the root diameter D2 of the worm gear 31 is greater than or equal to 21 mm and less than or equal to 22 mm, the tooth width of the worm gear 31 is greater than or equal to 15 mm and less than or equal to 19 mm, and the number of teeth of the worm gear 31 is greater than or equal to 14 and less than or equal to 19. The size of the worm gear accommodating chamber 424 for accommodating the worm gear 31 may be correspondingly reduced with the decrease of the size of the worm gear 31. Relative to the conventional electric circular saw 100, the size of the fan 60 may also be reduced. The diameter of the fan 60 is greater than or equal to 82 mm and less than or equal to 84 mm, and the surrounding part 422 for accommodating the fan 60 may be adjusted correspondingly. The size of the gearbox 42 may be reduced correspondingly so that the vertical distance between the center of the worm gear 31 and the base plate plane surface 55 is reduced. In this manner, the size of the whole electric circular saw 100 is optimized, a weight of the electric circular saw 100 is reduced, and the electric circular saw 100 is convenient for the user to hold and use. Referring to FIG. 6, the base plate 50 is rotatable with respect to the housing assembly 40, and the base plate 50 has the first position with respect to the housing assembly 40 where the electric circular saw 100 has the maximum cutting depth. At this time, the base plate plane surface 55 is parallel to the first axis 101 and the distance therebetween is minimum, and the second axis 102 where the motor shaft 12 is located intersects the base plate plane surface 55 to form the angle greater than zero degrees and less than or equal to 18 degrees. The outer diameter of the motor 10 is configured to be less than or equal to 95 mm so that the vertical distance between the center of the worm gear 31 and the base plate plane surface 55 is less than or equal to 24.5 mm. When the electric circular saw 100 adopts the saw blade 20 with a specification of 7.25 inches, the shortest distance L3 between the base plate plane surface 55 and the lowest point of the saw blade 20 is greater than or equal to 65.5 mm and less than or equal to 67.5 mm so that the electric circular saw 100 can cut woods with a specification of 2.5 inches when using the saw blade 20 with the specification of 7.25 inches.

In one example, the fan is disposed in the motor housing, the fan shield is disposed between the motor housing and the fan, and the interior of the motor housing is provided with the mounting grooves for fixing the fan shield so that the fan shield is supported.

In one example, the outer diameter of the motor 10 is configured to be less than 95 mm, and a stack length of the stator 11 of the motor 10 is configured to be greater than or equal to 28 mm and less than or equal to 60 mm so that rated output power of the motor 10 is greater than or equal to 1800 W. The base plate 50 is rotatable with respect to the housing assembly 40, and the base plate 50 has the first position with respect to the housing assembly 40 where the electric circular saw 100 has the maximum cutting depth. At this time, the base plate plane surface 55 is parallel to the first axis 101 and the distance therebetween is minimum. The tip diameter D3 of the worm 32 is configured to be greater than or equal to 20 mm and less than or equal to 30 mm, the root diameter D4 of the worm 32 is greater than or equal to 13 mm and less than or equal to 20 mm, and the tooth width of the worm 32 is greater than or equal to 18 mm and less than or equal to 20 mm. The number of teeth of the worm 32 is greater than or equal to 3 and less than or equal to 4. The tip diameter D1 of the worm gear 31 is configured to be greater than or equal to 20 mm and less than or equal to 35 mm, the root diameter D2 of the worm gear 31 is greater than or equal to 15 mm and less than or equal to 25 mm, the tooth width of the worm gear 31 is greater than or equal to 15 mm and less than or equal to 19 mm, and the number of teeth of the worm gear 31 is greater than or equal to 14 and less than or equal to 19. The size of the worm gear accommodating chamber 424 for accommodating the worm gear 31 may be correspondingly reduced with the decrease of the size of the worm gear 31. The size of the first bearing is adaptively adjusted such that the diameter of the first bearing is greater than or equal to 34 mm and less than or equal to 36 mm.

An angle of the motor shaft 12 is specially set such that when the base plate 50 is at the first position with respect to the housing assembly 40, the second axis 102 where the motor shaft 12 is located intersects the base plate plane surface 55 to form an angle greater than or equal to 10 degrees and less than or equal to 18 degrees, and a bottom of the gearbox 42 is provided with a groove 428 fitted to the base plate 50 so that the worm 32 can be closer to the base plate 50. To adapt to a size of the transmission assembly 30, a depth of the groove 428 is configured to be 6 mm to 8 mm. A size of the whole gearbox 42 may be correspondingly reduced and a height of the motor shaft 12 with respect to the base is increased so that when the distance between the center of the worm gear 31 and the bottom of the saw blade 20 is reduced, the motor housing 43 does not interfere with the base due to the arrangement of the angle of the motor 10. In this manner, when the base plate 50 is at the first position, the vertical distance between the center of the worm gear 31 and the base plate plane surface 55 is less than or equal to 25.5 mm so that when the electric circular saw 100 adopts the saw blade 20 with the specification of 7.25 inches, the shortest distance between the base plate plane surface 55 and the lowest point of the saw blade 20 is greater than or equal to 64.5 mm and less than or equal to 68.5 mm. On the premise that output performance of the motor 10 is ensured, the size of the whole electric circular saw 100 is reduced, the maximum cutting depth of the electric circular saw 100 is increased, and the electric circular saw 100 is convenient for the user to use. It is to be noted that when the base plate 50 is at the first position, the vertical distance between the center of the worm gear 31 and the base plate plane surface 55 is less than or equal to 25.5 mm. The vertical distance between the center of the worm gear 31 and the base plate plane surface 55 refers to the distance between the center of the worm gear 31 and the base plate plane surface 55 in the direction perpendicular to the base plate plane surface 55.

It is to be understood by those skilled in the art that the examples of the present disclosure illustrated in the above description and the drawings are not to limit the present disclosure. The function and structural principle of the present disclosure have been shown and illustrated in examples, and the examples of the present disclosure may be altered or modified without departing from the principle. Accordingly, such alterations or modifications are intended to fall within the protective scope of the appended claims.

What is claimed is:

1. An electric circular saw, comprising:
   a motor;
   a saw blade driven by the motor to rotate about a first axis;
   a transmission assembly connecting the motor to the saw blade;
   a housing assembly comprising a gearbox wherein the gearbox is configured to support the transmission assembly;
   a base plate connected to the housing assembly having a base plate plane surface for contacting a workpiece;
   a fan driven by the motor to generate a heat dissipation airflow; and
   a fan shield, which is at least in part disposed along a circumferential direction of the fan;
   wherein the fan shield comprises:
      a flow guide part configured to guide a flow direction of the heat dissipation airflow; and
      a fitting part disposed around the flow guide part in a circumferential direction of the flow guide part and connected to the gearbox; and
   wherein the transmission assembly consists of a single worm, a single worm gear that meshes with the worm, and an output shaft extending along the first axis, the worm gear is connected to the saw blade via the output shaft and configured to drive the saw blade, the first axis penetrates through a center of the worm gear, the worm is connected to the motor, a tip diameter of the worm gear is greater than or equal to 20 mm and less than or equal to 35 mm, a tip diameter of the worm is greater than or equal to 20 mm and less than or equal to 30 mm, the base plate is rotatable with respect to the housing assembly and has a first position where the electric circular saw has a maximum cutting depth, and a vertical distance between the center of the worm gear and the base plate plane surface is less than or equal to 25.5 mm when the base plate is at the first position,
   wherein the worm extends along a second axis, and an angle between the second axis and the base plate plane surface is greater than or equal to 10 degrees and less than or equal to 18 degrees when the base plate is at the first position, and
   wherein, the saw blade has a diameter of 7.25 inches, the maximum cutting depth of the electric circular saw is greater than or equal to 64.5 mm and less than or equal to 68.5 mm.

2. The electric circular saw of claim 1, wherein the flow guide part is annular or semi-annular, the fitting part is a protrusion disposed on an outer wall of the flow guide part, an interior of the gearbox is provided with a mounting groove, and the protrusion is placed in the mounting groove such that the fan shield is fixedly connected to the gearbox.

3. The electric circular saw of claim 1, wherein the fan comprises a rotating shaft and a fan blade connected to the rotating shaft, and a maximum diameter of the fan is greater than or equal to 70 mm and less than or equal to 85 mm.

4. The electric circular saw of claim 3, wherein the gearbox comprises a surrounding part disposed on an outer periphery of the fan shield and provided with a wind path rib for guiding the heat dissipation airflow.

5. The electric circular saw of claim 3, wherein a distance between an outer edge of the fan blade and the flow guide part is greater than or equal to 0.4 mm and less than or equal to 1.6 mm.

6. The electric circular saw of claim 1, wherein the base plate comprises a first adjustment assembly configured to adjust an inclination angle of the base plate with respect to the housing assembly and cause the base plate to rotate about a third axis with respect to the housing assembly, and a distance between the third axis and the saw blade is greater than or equal to 6 mm and less than or equal to 8 mm.

7. The electric circular saw of claim 6, wherein the base plate has a first side, a second side, and a perforation through which the saw blade penetrates, the first side is parallel to a plane where the saw blade is located, the second side is parallel to the plane where the saw blade is located, the perforation is closer to the second side than to the first side, and a shortest distance from the first side to the perforation ranges from 56.5 mm to 60.5 mm.

8. The electric circular saw of claim 7, wherein a distance between the third axis and the second side ranges from 45 mm to 49 mm.

9. The electric circular saw of claim 1, wherein an outer diameter of the motor is less than 95 mm, a stack length of a stator of the motor is greater than or equal to 28 mm and less than or equal to 60 mm, and a rated output power of the motor is greater than or equal to 1800 W.

* * * * *